United States Patent
Erdl et al.

(10) Patent No.: US 11,255,505 B2
(45) Date of Patent: Feb. 22, 2022

(54) VEHICLE HEADLIGHT

(71) Applicant: Bayerische Motoren Werke Aktiengesellschaft, Munich (DE)

(72) Inventors: Helmut Erdl, Flintsbach (DE); Andreas Kaltenbach, Unterschleissheim (DE); Ulrich Henseler, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 557 days.

(21) Appl. No.: 14/549,690

(22) Filed: Nov. 21, 2014

(65) Prior Publication Data

US 2015/0078026 A1    Mar. 19, 2015

Related U.S. Application Data

(63) Continuation of application No. PCT/EP2013/059978, filed on May 15, 2013.

(30) Foreign Application Priority Data

May 22, 2012    (DE) ................... 10 2012 208 516.5

(51) Int. Cl.
*F21V 9/00*    (2018.01)
*F21S 41/65*    (2018.01)
(Continued)

(52) U.S. Cl.
CPC ............ *F21S 41/65* (2018.01); *B60Q 1/0047* (2013.01); *B60Q 1/28* (2013.01); *B60Q 2400/30* (2013.01); *F21S 41/275* (2018.01)

(58) Field of Classification Search
CPC .... B60Q 1/0047; B60Q 1/28; B60Q 2400/30; B60Q 1/0052; F21S 48/1736;
(Continued)

(56) References Cited

U.S. PATENT DOCUMENTS

| | | | |
|---|---|---|---|
| 5,894,366 A * | 4/1999 | Ferrante | G02B 1/115 359/581 |
| 2009/0026958 A1 | 1/2009 | Kitagawa et al. | |

(Continued)

FOREIGN PATENT DOCUMENTS

| | | |
|---|---|---|
| CN | 101355842 A | 1/2009 |
| CN | 101793372 A | 8/2010 |

(Continued)

OTHER PUBLICATIONS

Chinese-language Office Action issued in counterpart Chinese Application No. 201380013091.6 dated Oct. 10, 2015 with English translation (Seventeen (17) pages).

(Continued)

*Primary Examiner* — Omar Rojas Cadima
(74) *Attorney, Agent, or Firm* — Crowell & Moring LLP

(57) ABSTRACT

A vehicle headlight includes a low beam light module and a appearance light module, which are embodied, arranged and designed such that, in a low beam mode, less than 30% of the light intensity emitted by the vehicle headlight with respect to a vertical orientation above the light-shadow line and with respect to the horizontal orientation in the direction of travel, is generated by the low beam light module.

17 Claims, 3 Drawing Sheets

(51) Int. Cl.
*B60Q 1/28* (2006.01)
*B60Q 1/00* (2006.01)
*F21S 41/275* (2018.01)

(58) Field of Classification Search
CPC ...... F21S 48/125; F21S 48/13; F21S 48/1241; F21S 41/143; F21S 41/24; F21S 41/25; F21S 41/26; F21W 2102/155; F21K 9/61
USPC .................................. 362/511, 516, 520, 543
See application file for complete search history.

(56) References Cited

U.S. PATENT DOCUMENTS

| | | | |
|---|---|---|---|
| 2010/0008101 A1* | 1/2010 | Bucher | B60Q 1/0052 362/565 |
| 2010/0194276 A1 | 8/2010 | Okubo et al. | |
| 2012/0069592 A1 | 3/2012 | Natsume et al. | |
| 2012/0170299 A1 | 7/2012 | Morgenstern et al. | |
| 2013/0223089 A1* | 8/2013 | Danner | F21S 41/24 362/511 |

FOREIGN PATENT DOCUMENTS

| | | | | |
|---|---|---|---|---|
| DE | 196 27 936 A1 | 1/1998 | | |
| DE | 101 18 687 A1 | 10/2002 | | |
| DE | 10 2005 025 481 A1 | 12/2006 | | |
| DE | 20 2007 010 640 U1 | 11/2007 | | |
| DE | 10 2009 041 189 A1 | 3/2011 | | |
| DE | 10 2010 008 595 A1 | 8/2011 | | |
| DE | 10 2010 013 821 A1 | 10/2011 | | |
| EP | 2 119 956 A1 | 11/2009 | | |
| FR | 001214556 B | * | 12/1993 | ........... B60Q 1/1415 |
| GB | 818164 A | * | 8/1959 | ............... B60Q 1/14 |
| JP | 2010-212109 A | | 9/2010 | |
| WO | WO 2011/029493 A1 | | 3/2011 | |
| WO | WO-2011117795 A1 | * | 9/2011 | ............ F21S 41/143 |
| WO | WO-2012083331 A | * | 6/2012 | ............ F21S 41/153 |

OTHER PUBLICATIONS

Tagfahrlicht, Wikipedia, edited on Dec. 5, 2012 with machine English translation (21 pages).
German Search Report dated Jan. 25, 2013 with partial English-language translation (Ten (10) pages).
International Search Report (PCT/ISA/210) dated Aug. 30, 2013 with English-language translation (Four (4) pages).
German-language European Office Action issued in European application No. 13725110.4-1012 / 2852512 dated Jan. 28, 2020 (Eight (8) pages).

* cited by examiner

VEHICLE HEADLIGHT

CROSS REFERENCE TO RELATED APPLICATIONS

This application is a continuation of PCT International Application No. PCT/EP2013/059978, filed May 15, 2013, which claims priority under 35 U.S.C. § 119 from German Patent Application No. 10 2012 208 516.5, filed May 22, 2012, the entire disclosures of which are herein expressly incorporated by reference.

BACKGROUND AND SUMMARY OF THE INVENTION

The invention relates to a vehicle headlight

As is known, for example, from DE 102010008595A1, vehicle headlights are capable of implementing a low beam light distribution in a low beam light mode (low beam light operating mode) and, independently thereof, implementing a daytime running light distribution in a daytime running light mode (daytime running light operating mode).

It is a goal of the present light development to provide motor vehicle lights, in particular vehicle headlights, with a high recognition value. In the past, this was attempted in particular by especially pronounced implementations of the daytime running light illumination surface. Thus, particularly noticeable daytime running light illumination surfaces in the form of rings, double rings, or rockers are known. The recognition value for the headlights, the vehicle, or even the vehicle make which is achievable by such noticeable daytime running illumination surfaces is weakened again in that the same headlights convey a completely different appearance, which is based on a low beam illumination surface, in the darkness.

The object of the invention is to provide a vehicle headlight by which a substantially identical appearance is conveyed in the night, in particular in the low beam light operating mode, and in the day, in particular in the daytime running light operating mode.

This and other objects are achieved according to the invention by a vehicle headlight, having at least one low beam light module and at least one appearance light module, which are embodied, arranged, and aligned such that in a low beam light mode, in particular for implementing a low beam light distribution, less than 30% of the light intensity emitted by the vehicle headlight, above the cut-off line (a light-shadow line) with respect to the vertical alignment and in the travel direction with respect to the horizontal alignment, is generated by the low beam light module.

The invention is accordingly based on the idea of generating the appearance of a vehicle headlight in the low beam light mode and in the daytime running light mode by way of an appearance light module.

To enable this, the vehicle headlight is embodied such that the appearance, which is regularly perceptible to an observer due to the appearance light module, is not outshined by the low beam light module even in a low beam light mode.

Expressed simply, this is achieved in that the light intensity, which is emitted by the low beam light module in a direction above the cut-off line, in particular with regard to the horizontal alignment in the travel direction, and therefore is generally perceptible to an observer, is low in comparison to the light intensity emitted by the appearance light module in a direction above the cut-off line.

Thus, in the low beam light mode, a required light intensity which is predefined by the regulating authorities is implemented below the cut-off line essentially by the low beam light module and simultaneously, the appearance of the vehicle headlight perceptible above the cut-off line is characterized by the appearance light module.

A vehicle headlight according to the invention has a low beam light module and an appearance light module, which are embodied, arranged, and aligned such that in a low beam light mode, in particular for implementing a low beam light distribution, less than 30%, in particular less than 20% or less than 10% or less than 5% or less than 3%, of the light intensity emitted through the vehicle headlight, with regard to the vertical alignment, in particular in one or more directions, above the cut-off line and with respect to the horizontal alignment in the travel direction, in particular forward in the vehicle longitudinal direction, is generated by the low beam light module.

The respective remaining component of the light intensity emitted by the vehicle headlight above the cut-off line, in particular in one or more directions, with respect to the vertical alignment and forward in the travel direction, in particular in the vehicle longitudinal direction, with respect to the horizontal alignment, is preferably generated in this case essentially or completely by the appearance light module. Particularly preferably more than 70%, in particular more than 80% or more than 90% or more than 95% or more than 97%, of the light intensity emitted by the vehicle headlight with respect to the vertical alignment, in particular in one or more directions, above the cut-off line and with respect to the horizontal alignment in the travel direction, is generated by the appearance light module in the low beam light mode.

The mentioned component limits have proven to be particularly advantageous in complex simulations. If these limits are maintained, the appearance which is regularly perceptible to an observer is also characterized by the appearance light module in the low beam light mode.

According to a particularly advantageous embodiment, the cut-off line (also known as a light-shadow line) is an adaptive cut-off line, which is automatically adapted as a result of the surrounding situation, for example.

According to a further advantageous embodiment, less than 10%, in particular less than 5% or less than 3%, of the light intensity emitted by the vehicle headlight below the cut-off line with respect to the vertical alignment, in particular in one or more directions, and in the travel direction with respect to the horizontal alignment, is generated by the appearance light module in the low beam light mode, in particular to implement a low beam light distribution.

Furthermore, one embodiment of the invention provides that more than 90%, in particular more than 95% or more than 98%, of the light intensity emitted by the vehicle headlight below the cut-off line with respect to the vertical alignment, in particular in one or more directions, and in the travel direction with respect to the horizontal alignment, is generated by the low beam light module in the low beam light mode.

It is another refinement of the invention that in a daytime running light mode, in particular for generating a daytime running light distribution, more than 90%, in particular more than 99%, of the light intensity emitted by the vehicle headlight in the travel direction with respect to the horizontal alignment is generated by the appearance light module.

In this case, in the daytime running light mode, in particular for generating a daytime running light distribution, the low beam light module preferably provides a subordinate contribution (for example, less than 5%) or no contribution. In particular, it may be provided that the low beam light module is deactivated in the daytime running light mode.

The appearance light module is preferably dimmed in the low beam light mode in relation to the daytime running light mode.

According to a further advantageous embodiment of the invention, the appearance light module comprises an optical waveguide module, by which a brand-characterizing appearance of the vehicle headlight is implemented in the low beam light mode and in the daytime running light mode.

The low beam light module and the appearance light module are preferably implemented by different light sources.

It is particularly preferably provided that in the low beam light mode, less than 20%, in particular less than 15%, less than 10%, or less than 5% or less than 3% of the luminous flux (also called luminous power) generated by the low beam light module is emitted above the cut-off line.

Another refinement provides that in the low beam light mode, more than 40%, in particular more than 55%, more than 75%, more than 90%, or more than 95%, of the luminous flux generated by the appearance light module is emitted above the cut-off line.

Accordingly, it can be provided that in the low beam light mode, less than 60%, in particular less than 45%, less than 25%, less than 10%, or less than 5% of the luminous flux generated by the appearance light module is emitted below the cut-off line.

The low beam light module is preferably embodied as a projection system, wherein an imaging lens of the projection system has an antireflective coating. The scattered light component of the low beam light module is thus reduced. The further above-mentioned particularly low light intensities emitted by the low beam light module above the cut-off line can thus be implemented.

Preferably, at least one or all lenses of the projection system are embodied with low scattered light; this preferably comprises, for example, the sharpest possible embodiment of delimitation edges of the lens or the lenses, blackening and/or coating of lens edge surfaces which are not functionally necessary, low surface roughness of the lens or the lenses, no surface structures, and/or a coating of at least one lens surface to avoid additional reflections.

As an antireflective coating, preferably dielectric layer stacks of preferably 4-8 layers are provided, and/or microstructures, so-called moth eye structures having a preferred extension in the range of 0.01-50 µm, which are preferably already included in the production process of the lens molding.

The low beam light module may preferably be embodied as a projection system, wherein the temperature of the projection system is embodied as light-absorbing. The further above-mentioned particularly low light intensities emitted by the low beam light module above the cut-off line can also thus be implemented.

The low beam light module may preferably be embodied as a projection system, wherein the light guide in the rear lens region is embodied as low in scattered light. The further above-mentioned particularly low light intensity emitted by the low beam light module above the cut-off line can also thus be implemented.

The low beam light module may preferably be embodied as a reflector system, wherein the surface of the reflector is embodied as low in scattered light by its surface quality and edge composition of the edges. The further above-mentioned particularly low light intensity emitted by the low beam light module above the cut-off line can also thus be implemented.

In the low beam light mode, the light current generated by the low beam light module preferably corresponds to at least two times, in particular at least three times or at least four times, the light current generated by the appearance light module.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
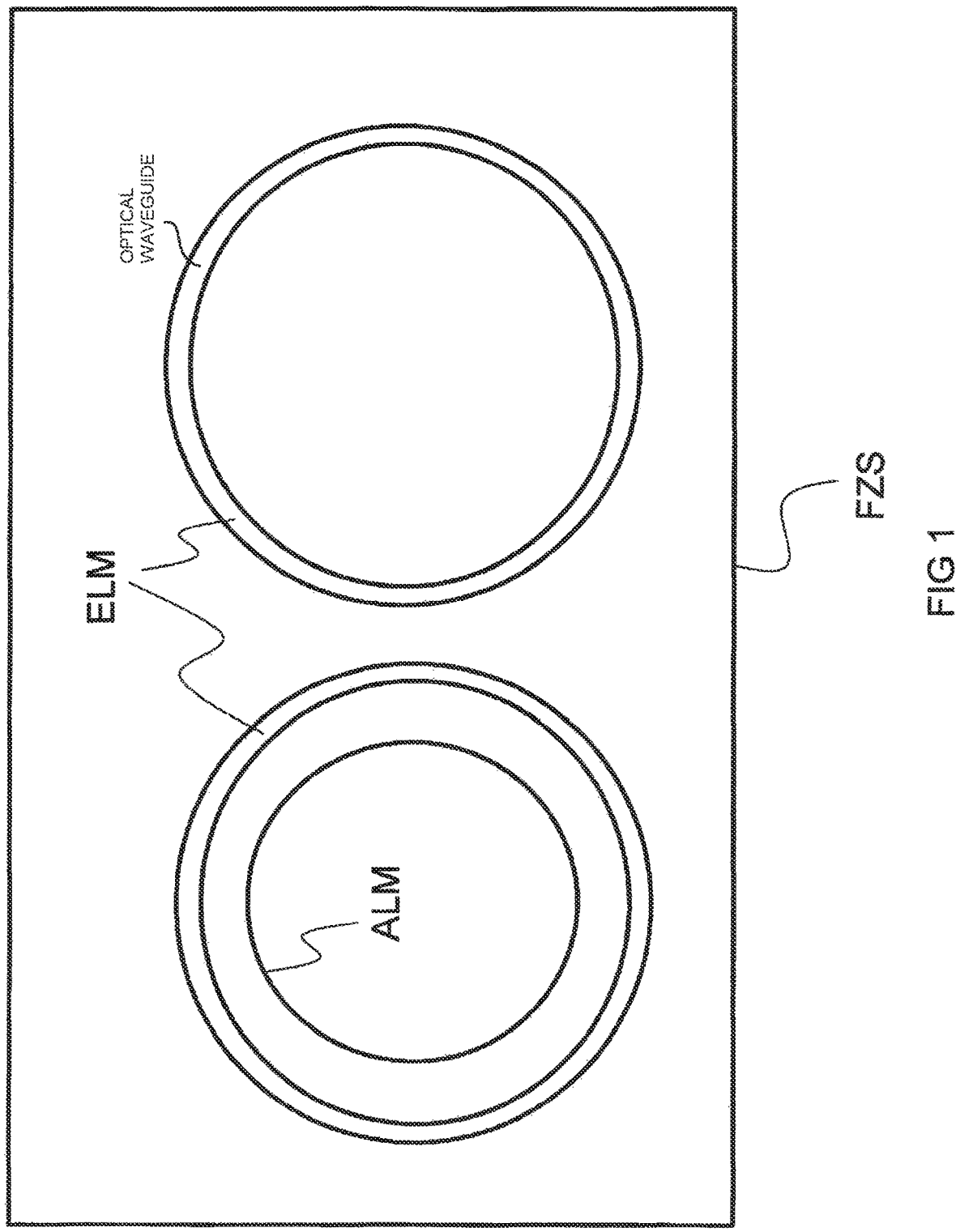
FIG. 1 is a simplified schematic diagram of a vehicle headlight in a front view.

The vehicle headlight FZS shown in FIG. 1 has a low beam light module ALM, which is implemented as a projection system or reflection system, for example, and by which a low beam light distribution is substantially generated.

In addition, an appearance light module ELM is provided, using which, for example, on the basis of optical waveguides supplied with LED light (two light rings here), a daytime running light distribution is generated. In addition, the appearance light module ELM provides, in particular above the cut-off line, a contribution to the low beam light distribution, so that both in the daytime running light mode and also in the low beam light mode, the appearance of the vehicle headlight FZS is characterized by the appearance light module for an observer standing in front of the vehicle headlight.

The low beam light module ALM and the appearance light module ELM are each supplied in this case by at least one light source (not shown), wherein the light sources are different.

Figure 2:
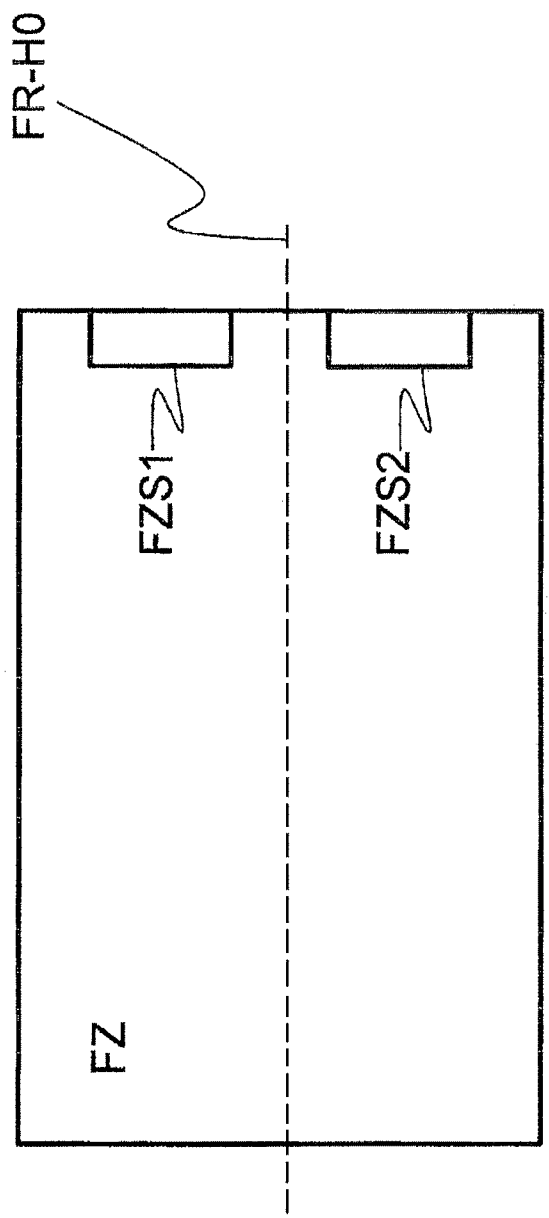
FIG. 2 is a simplified schematic diagram of a vehicle in a top view.

FIG. 2 shows a top view of a vehicle FZ having two vehicle headlights FZS1, FZS2. A longitudinal axis of the vehicle FZ is defined by the arrow FR-H0, which is also shown, for example, in the side view of the vehicle FZ in FIG. 3.

Figure 3:
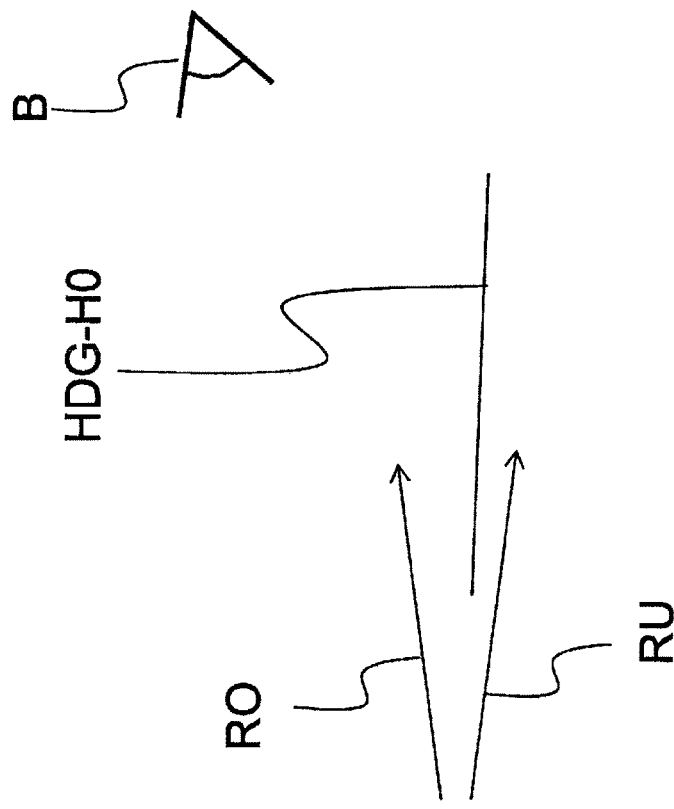
FIG. 3 is a simplified schematic diagram of a vehicle in a side view.
Figure 3:
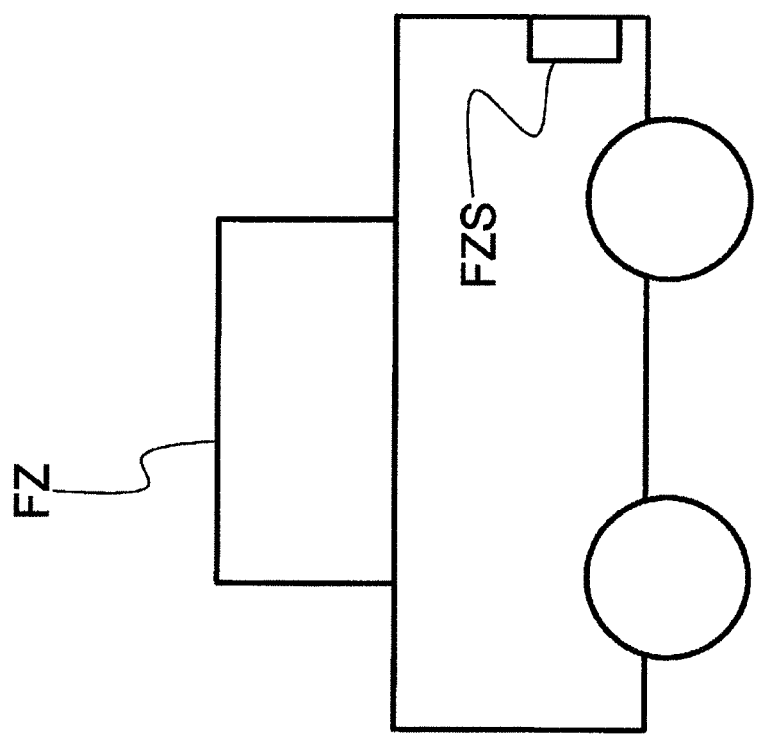

FIG. 3 also shows a vehicle FZ together with vehicle headlights FZS (only one of which is shown) in a side view. In addition, the cut-off line HDG-H0 in the horizontal zero degree direction is shown. In addition, in relation to the light emitted by the vehicle headlights, in each case an emission direction RO above the cut-off line and an emission direction RU below the cut-off line are shown as examples.

In addition, an observer B is shown, whose eyes are generally positioned above the cut-off line (for example, in the case of a standing observer or in the case of an observer seated in another vehicle). The observer B is therefore generally not blinded by light which is emitted in a direction below the cut-off line. The appearance perceived by an observer B is generally characterized, in contrast, by light which is emitted in a direction above the cut-off line.

The invention is therefore based on the idea of equipping a vehicle headlight FZS with a low beam light module ALM and an appearance light module ELM, which are embodied, arranged, and aligned such that in a low beam light mode, in particular to implement a low beam light distribution, relatively little of the light intensity, in particular less than in the case of a low beam light module according to the prior art, which is emitted by the vehicle headlight above the cut-off line is generated by the low beam light module. In contrast, in the low beam light mode, a relatively large amount, in particular more than in the case of an appearance light module according to the prior art, of the light intensity emitted by the vehicle headlight above the cut-off line, is generated by the appearance light module. Thus, the appearance which is generally generated for an observer by the appearance light module is not or not strongly outshone, superimposed, or blanked out by the light of the low beam light module, and therefore generally the appearance of the vehicle headlight is also characterized by the appearance light module in the low beam light mode.

A particularly advantageous embodiment variant of a vehicle headlight will be described in greater detail hereafter. The vehicle headlight FZS is disposed with a low beam light module and an appearance light module, which are embodied, arranged, and aligned such that in a low beam light mode, in particular to implement a low beam light distribution, less than 15% of the light intensity emitted by the vehicle headlight above the cut-off line with respect to the vertical alignment and in the travel direction with respect to the horizontal alignment is generated by the low beam light module.

In addition, in the low beam light mode, more than 80% of the light intensity emitted by the vehicle headlight above the cut-off line with respect to the vertical alignment and in the travel direction with respect to the horizontal alignment is generated by the appearance light module.

Alternatively or additionally, in the low beam light mode, less than 5% of the light intensity emitted by the vehicle headlight above the cut-off line with respect to the vertical alignment and in the travel direction with respect to the horizontal alignment is generated by the low beam light module.

Alternatively or additionally, in the low beam light mode, more than 90% of the light intensity emitted by the vehicle headlight above the cut-off line with respect to the vertical alignment and in the travel direction with respect to the horizontal alignment is generated by the appearance light module.

Alternatively or additionally, in a daytime running light mode, in particular to generate a daytime running light distribution, more than 99% of the light intensity emitted by the vehicle headlight in the travel direction with respect to the horizontal alignment is generated by the appearance light module.

Alternatively or additionally, in a daytime running light mode, in particular to generate a daytime running light distribution, the low beam light module provides a subordinate contribution or no contribution. The low beam light module is preferably deactivated in the daytime running light mode.

The appearance light module is preferably only dimmed enough in the low beam light mode in relation to the daytime running light mode so that the maxima in the legal regulations on the overall light distribution are not exceeded.

Alternatively or additionally, in the low beam light mode, less than 15% of the luminous flux generated by the low beam light module is emitted above the cut-off line.

Alternatively or additionally, in the low beam light mode, more than 55% of the luminous flux generated by the appearance light module is emitted above the cut-off line.

The above-mentioned light intensities are either implemented by methods known per se for the embodiment, arrangement, and alignment of light modules, wherein it can be provided in addition that in the case of the embodiment of the low beam light module as a projection system, an imaging lens of the projection system has an antireflective coating and/or an aperture of the projection system is embodied as light-absorbing. Alternatively or additionally thereto, it can be provided that in the case of the embodiment of the low beam light module as a projection system, the light guide in the rear lens region is embodied having low scattered light.

In the case of the embodiment of the low beam light module as a reflector system, it can be provided that the surface of the reflector of the reflector system having high surface quality is embodied having particularly low scattered light. In addition, aperture guides which prevent scattered light and light source enclosures which absorb scattered light can be provided in this case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle headlight of a vehicle, comprising:
a low beam light module including a lens, the low beam light module configured to emit a first portion of a visible low beam light distribution via the lens in a low beam light mode, the low beam light distribution having a cut-off line at a distance; and
an appearance light module including a waveguide defining an appearance of the vehicle headlight, the appearance light module configured to emit a visible daytime light distribution via the waveguide in both a daytime light mode and the low beam light mode, each distinct from a high beam mode, the daytime light distribution extending above the cut-off line at the distance,
wherein, in the low beam light mode, the daytime light distribution forms a second portion of the low beam light distribution at the distance, such that the vehicle headlight has a defined appearance, to an observer viewing the headlight from above the cut-off line, that is substantially identical in both the low beam light mode and the daytime light mode, and
wherein less than 30% of a light intensity of the low beam light distribution that is above the cut-off line is generated by the low beam light module.

2. The vehicle headlight according to claim 1, wherein less than 20% of the light intensity of the low beam light distribution that is above the cut-off line is generated by the low beam light module.

3. The vehicle headlight according to claim 2, wherein more than 80% of the light intensity of the low beam light distribution that is above the cut-off line is generated by the appearance light module.

4. The vehicle headlight according to claim 1, wherein less than 10% of the light intensity of the low beam light distribution that is above the cut-off line is generated by the low beam light module.

5. The vehicle headlight according to claim 4, wherein more than 90% of the light intensity of the low beam light distribution that is above the cut-off line is generated by the appearance light module.

6. The vehicle headlight according to claim 1, wherein less than 5% of the light intensity of the low beam light distribution that is above the cut-off line is generated by the low beam light module.

7. The vehicle headlight according to claim 6, wherein more than 95% of the light intensity of the low beam light distribution that is above the cut-off line is generated by the appearance light module.

8. The vehicle headlight according to claim 1, wherein less than 3% of the light intensity of the low beam light distribution that is above the cut-off line is generated by the low beam light module.

9. The vehicle headlight according to claim 8, wherein more than 97% of the light intensity of the low beam light distribution that is above the cut-off line is generated by the appearance light module.

10. The vehicle headlight of claim 1, wherein in the low beam light mode, more than 70% of the light intensity emitted by the vehicle headlight above the cut-off line is generated by the appearance light module.

11. The vehicle headlight according to claim 1, wherein less than 10% of the light intensity of the low beam light distribution that is below the cut-off line is generated by the appearance light module.

12. The vehicle headlight according to claim 11, wherein more than 90% of the light intensity of the low beam light distribution that is below the cut-off line is generated by the low beam light module.

13. The vehicle headlight according to claim 1, wherein in the daytime light mode, the low beam light module emits a subordinate light contributing to less than 10% of the light intensity of the daytime light distribution, or emits no subordinate light.

14. The vehicle headlight according to claim 1, wherein the low beam light module and the appearance light module have different light sources.

15. The vehicle headlight according to claim 1, wherein, in the low beam light mode, less than 20% of a total luminous power generated by the low beam light module is emitted above the cut-off line.

16. The vehicle headlight according to claim 15, wherein, in the low beam light mode, more than 40% of a total luminous power generated by the appearance light module is emitted above the cut-off line.

17. The vehicle headlight according to claim 1, wherein, in the low beam light mode, a total luminous power generated by the low beam light module is at least two times a total luminous power generated by the appearance light module.

* * * * *